United States Patent [19]

Kowal et al.

[11] Patent Number: 4,621,842

[45] Date of Patent: Nov. 11, 1986

[54] RELEASABLE PUSH-TO-CONNECT TUBE FITTING

[75] Inventors: Leonard J. Kowal, Prospect Heights; Albert J. Schwarz, Lincolnwood; Norman B. Wells, Skokie, all of Ill.

[73] Assignee: Imperial Clevite Inc., Glenview, Ill.

[21] Appl. No.: 708,164

[22] Filed: Mar. 4, 1985

[51] Int. Cl.[4] .................................. F16L 21/06
[52] U.S. Cl. .................................. 285/322; 285/382
[58] Field of Search .................. 285/322, 323, 382

[56] References Cited

U.S. PATENT DOCUMENTS

| 2,389,233 | 11/1945 | Cowles | 285/322 X |
| 3,150,886 | 9/1964 | Briegel et al. | 285/322 X |
| 3,266,823 | 8/1966 | Word et al. | 285/323 X |
| 3,653,689 | 4/1972 | Sapy et al. | |
| 3,909,046 | 9/1975 | Legris . | |
| 4,005,883 | 2/1977 | Guest . | |
| 4,021,062 | 5/1977 | Mariaulle . | |
| 4,030,741 | 6/1977 | Fidrych | 285/322 X |
| 4,178,023 | 12/1979 | Guest . | |

FOREIGN PATENT DOCUMENTS 379413   9/1932   United Kingdom ............. 285/323

*Primary Examiner*—Dave W. Arola
*Attorney, Agent, or Firm*—Russell E. Baumann

[57] ABSTRACT

A releasable push-to-connect tube fitting wherein a collet receiving the tube end is provided with longitudinally extending inner slots permitting constriction of the inner end of the collet about the tube end in the made-up condition of the fitting. The slots are sized so as to limit the constriction so as to maintain the outer diameter of the inner end of the collet greater than the minimum diameter of the confronting camming surface of the fitting body member, thereby effectively positively retaining the collet in the body member upon assembly of the fitting elements. The collet further includes an enlarged outer end exposed exteriorly of the fitting body in the made-up arrangement of the fitting for facilitated fingertip manipulation of the collet in releasing the tube from the fitting when desired. The collet is retained in the outer end of the body by constrictive deformation of the body outer end portion after installation of the inner portion of the collet therein. The constrictive deformation is effected by a suitable tool so as to define the desired inner surfaces of the body end cooperating with the collet in effecting the positive sealed connection of the tube end to the fitting.

10 Claims, 5 Drawing Figures

RELEASABLE PUSH-TO-CONNECT TUBE FITTING

BACKGROUND OF THE INVENTION

1. Field of the Invention

This invention relates to tube fittings and in particular to releasable push-to-connect tube fittings.

2. Description of the Background Art

In one form of releasable push-to-connect tube fitting, a collet is received within an end portion of the fitting body. The tube end is coaxially inserted through the collet for effecting a sealed connection of the tube end to the fitting body.

A number of different fittings have been developed for effecting such a tube connection. Illustratively, in U.S. Pat. No. 3,909,046 of Andre Legris, a tube fitting is shown wherein a tubular collet is firstly installed in a tubular member having at its axially inner end a tapered camming surface. The collet is installed from the inner end of the tubular member and, thus, the outer end of the collet must be no bigger than the minimum diameter of the bore of the tubular member. Resultingly, as shown in the Legris patent, it is difficult to release the tube from the fitting as such release requires the forceful urging of the collet axially inwardly as by a screwdriver acting on the relatively small distal end of the collet projecting from the fitting. In addition, the tubular member must be fixedly secured in the fitting body, thereby increasing the cost of the fitting and further providing a potential area of failure of the fitting should the tubular member not remain fixedly secured in the body.

Another collet-type tube coupling is illustrated in U.S. Pat. No. 4,178,023 of John D. Guest. As shown therein, the collet is provided with slots, permitting the inner end of the collet to be sufficiently compressed so as to permit it to pass axially inwardly through the small end of a tapered bore of the fitting body. This permits the collet to be assembled from outside the fitting body and permits the outer end of the collet to have a relatively large turned flange so as to permit facilitated axially inward movement of the collet in releasing the tube end from the fitting when desired. This design, however, has the serious disadvantage of potentially permitting the outward movement of the collet when the fitting is subjected to substantial fluid pressures as it is the resiliency of the slotted end of the collet which is retaining the collet in the fitting. The chance of such failure is further increased where the tubing is of relatively soft material, such as synthetic resins, which offer relatively small resistance to radial inward constriction of the slotted collet end.

SUMMARY OF THE INVENTION

The present invention comprehends an improved releasable push-to-connect tube fitting eliminating the problems of the above discussed prior art devices in a novel and simple manner.

More specifically, the invention comprehends an improved fitting wherein the collet is provided with longitudinal slots at the inner end, but wherein the constrictibility of the slotted end is limited so as to prevent constriction to less than the minimum diameter of the collet bore, thereby effectively positively retaining the collet in the bore against blowout as from high pressure and the like in the fitting.

The invention further comprehends the provision of such a fitting wherein the collet is provided with a relatively large outer end for facilitated inward urging of the collet to release the tube from the fitting when desired.

The invention comprehends the provision of such a fitting wherein the body member defines an outer end portion which is constricted about the collet subsequent to the insertion of the collet coaxially thereinto, thereby effectively retaining the collet within the body end.

The invention comprehends that the body end be formed of a material having a rigidity substantially greater than the rigidity of the constrictible collet inner end, whereby the collet is effectively positively retained in the body end against blowout and the like.

In the illustrated embodiment, the body end is constricted as by swaging thereof subsequent to the installation of the collet therein.

The body end defines a frustoconical camming surface engaging the inner end of the collet for effecting constriction thereof tightly about the tube end inserted therethrough in effecting the desired sealed connection of the tube end to the body.

The collet may be provided with an inwardly projecting gripping portion at the inner end thereof for effectively positively engaging the tube end in the made-up arrangement of the fitting for further improved retention of the tube end in sealed connection to the body.

In the illustrated embodiment, the outer end of the collet is defined by a radially outturned flange. The flange has a maximum outer diameter no greater than the minimum outer diameter of the body end portion, but substantially greater than the inner diameter of the body end portion so as to provide for faciliated manipulation of the collet from externally of the body.

The fitting of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
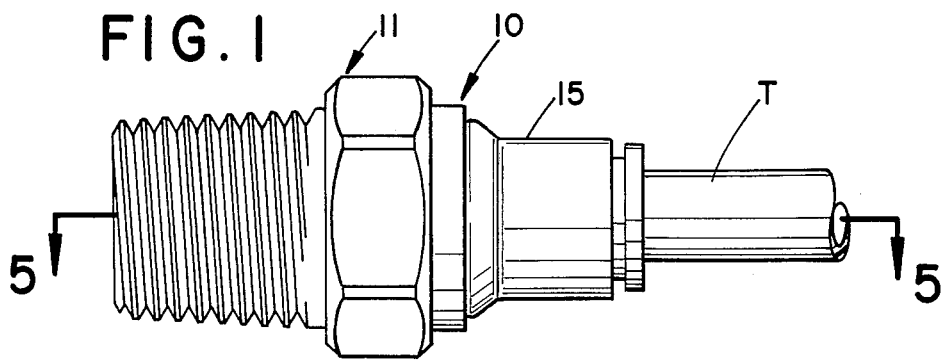
FIG. 1 is a side elevation of a fitting embodying the invention showing a portion of a tube end connected thereto.

In the exemplary embodiment of the invention as disclosed in the drawing, a tube fitting generally designated 10 is shown to comprise a body 11, a collet 12, and a seal 13.

The body is provided with a through bore 14. The body defines an axially outer end 15 in turn defining a radially inner surface 16. Surface 16 defines the axially outer end of the through bore 14, and includes an axially outer, first cylindrical portion 17, an axially inwardly widening frustoconical, axially inner portion 18, and an axially inner cylindrical portion 19.

In the illustrated embodiment, the outer end 15 of body 11 is formed by suitable means, such as swaging element 20. Thus, as seen in FIG. 2, body 11 is originally provided with a right circularly cylindrical tubular end 21 defining the outer end of bore 14. Swaging tool 20 is engaged with the tubular body end 21, as illustrated in FIGS. 3 and 4, so as to deform the tubular end 21 so as to define the desired stepped configuration of the fitting outer end portion 15 illustrated in FIGS. 1, 4, and 5.

More specifically, the inner swaging surface of the tool 20 is defined by an outer right circularly cylindrical surface portion 22 having a diameter equal to the desired outer diameter of the outer end 23 of the body portion 15. The tool further defines a frustoconical inner surface 24 arranged to form the frustoconical midportion 25 of the body outer end 15.

Figure 3:
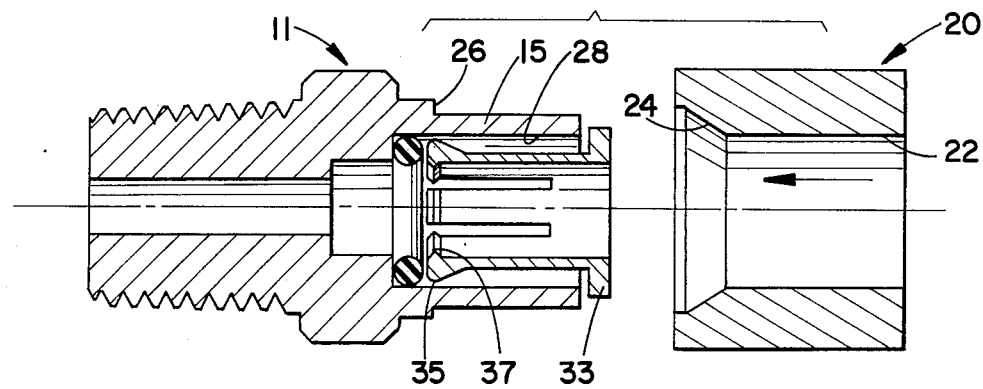
FIG. 3 is a diametric section illustrating a first step in the forming of the body end portion to retain the collet in association therewith.
Figure 4:
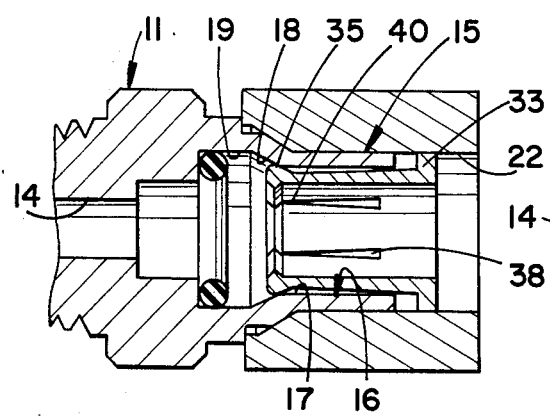
FIG. 4 is a diametric section illustrating a final step in the constriction of the body end portion.

As further seen in FIGS. 3 and 4, body 11 defines a radial shoulder surface 26 disposed to be abutted by the axially inner end 27 of the tool 20 at the end of the forming operation. The cylindrical inner surface 28 of the undeformed body end 21 extends axially inwardly of the plane of surface 26. Thus, the cylindrical inner portion 19 of the surface 16, as seen in FIG. 4, is unconstricted and remains at the diameter of the inner surface 28 prior to deformation of the body end by the tool 20.

Figure 5:
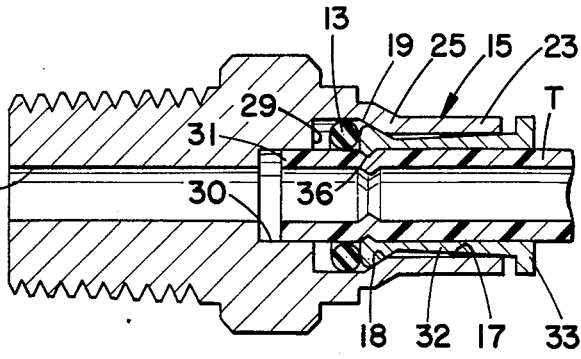
FIG. 5 is a diametric section illustrating the arrangement of the made-up fitting with the tube end connected thereto.

As seen in FIG. 5, the seal 13 comprises an O-ring which is disposed within the surface portion 19 and in abutment with a radial shoulder surface 29 at the axially inner end of the surface 19.

As further illustrated in FIG. 5, the body bore 14 includes a radially enlarged cylindrical midportion 30 having a diameter substantially equal to the outer diameter of the tube T to be connected to the fitting, permitting the distal end 31 of the tube to be received therein in the made-up condition of the fitting, as shown in FIG. 5. In the made-up condition, O-ring 13 is radially compressed between the tube end and surface 19 so as to provide a seal of the tube end to the body 11.

As best seen in FIG. 2, collet 12 is defined by a tubular midportion 32, an axially outer, radially enlarged end 33, and an axially inwardly, radially inwardly and outwardly enlarged end 34. The inner diameter of portions 32 and 33 is substantially equal to the outer diameter of the tube T to be connected, as illustrated in FIG. 5.

Outer end 33, in the illustrated embodiment, is defined by an outturned flange having an outer diameter which is no greater than the diameter of tool surface portion 22, as illstrated in FIG. 4.

Inner end 34 of the collet is defined by a radially outwardly projecting boss 35 and a radially inwardly projecting boss 36. The outer diameter of boss 35 is greater than the minimum diameter of the frustoconical surface portion 18 of bore surface 16.

Radially inwardly projecting boss 36 is defined by an inner sharp edge 37 adapted to bite into the outer surface of the tube end in the made-up arrangement of the fitting, as illustrated in FIG. 5.

The collet is further provided with at least one, and in the illustrated embodiment, a plurality of longitudinally extending slots 38. In the illustrated embodiment, the slots are equiangularly circumferentially spaced about the axis 39 of the collet. The circumferential extent of the slots is preselected so that when the inner end of the collet is constricted so as to close the slots at their inner ends 40, as illustrated in FIG. 4, the outer diameter of the boss 35 remains larger than the minimum diameter of the frustoconical surface 18. Thus, the collet is effectively positively prevented from being withdrawn from the body end 15 upon completion of assembly of the fitting, as illustrated in FIG. 4. Such constriction of the collet inner end may be effected by pressure forces acting within the fitting tending to urge the collet and tube end axially outwardly so as to urge the collet outer boss 35 forcibly against the frustoconical portion 18 of the body surface 16, as illustrated in FIG. 5. When fluid pressure is present within the fitting, the O-ring 13 would tend to be urged against the collet end 34 so as to effect the seal between the tube end and body, as discussed above.

As further illustrated in FIG. 5, the urging of the collet end portion 35 against the frustoconical surface 18 tends to constrict the slotted end of the collet so as to urge the sharp-edged inner boss 36 radially into the surface of the tube end, thereby assisting in the positive retention of the tube end in the made-up connection of the tube end to the fitting.

Figure 2:
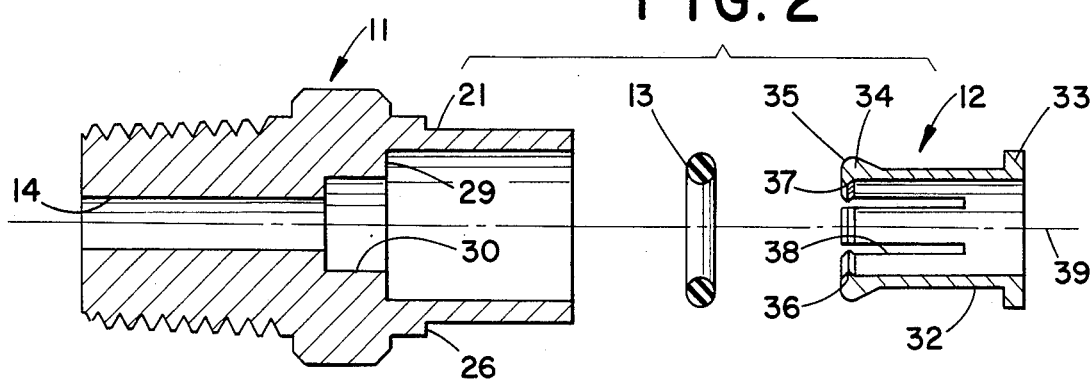
FIG. 2 is an exploded diametric section of the fitting.

As indicated briefly above, the body end 21 is caused to have a rigidity greater than the rigidity of the collet material so as to effectively positively retain the collet in the body end when assembled, as seen in FIGS. 1, 4, and 5. In the illustrated embodiment, both the body and collet are formed of metal and provide high strength positive retention of the tube end in sealed connection to the fitting, as discussed above.

By virtue of the relatively large radial configuration of the collet end 33, fingertip manipulation of the collet may be readily effected, avoiding the need for the use of screwdrivers and the like, as required in the fittings of the prior art.

The tube fitting of the present invention is extremely simple and economical of manufacture, and utilizes only three parts in effecting the high strength, improved positive sealing of the tube end to the fitting. The fitting is adapted to resist blowout against relatively high pressures, and as discussed above, provides for facilitated tubing release by fingertip engagement with the exposed relatively large end 33 of the collet.

The foregoing disclosure of specific embodiments is illustrative of the broad inventive concepts comprehended by the invention.

We claim:

1. A releasable tube fitting comprising:

a body provided with a through bore, said body having an axially outer end defining a radially inner surface defining the axially outer end of said bore and including an axially outer first cylindrical portion, and an axially inwardly widening frustoconical axially inner portion; and an annular collet for coaxially receiving the end of a tube for connection to said body, said collet defining an axis and being coaxially received in said bore outer end and having a tubular midportion, an axially outer radially outwardly turned flange axially outwardly of said body outer end and having an outer diameter greater than the diameter of the axially outer end of the bore and no greater than the minimum outer diameter of said body outer end for ease of tube release, and to allow a deforming tool to pass thereover to form said axially outer first cylindrical portion and said axially inwardly widening frustoconical axially inner portion an axially inner end radially inwardly of said frustoconical inner portion of the bore outer end and having a radially outwardly projecting camming portion, and a radially inwardly directed tube gripping portion, said collet further having at least one longitudinally extending slot at said axially inner end permitting constriction of said collet inner end as an incident of the collet being urged axially outwardly with said camming portion engaging said frustoconcial bore surface portion, the total slot width circumferentially of the collet axis being preselected to cause the minimum outer diameter of said camming portion when said inner end of the collet is fully radially constricted to be greater than the diameter of the outer end of said frustoconical bore surface portion.

2. The tube fitting of claim 1 wherein an annular seal is coaxially disposed in said bore axially inwardly of said collet inner end defining means for sealing a tube end extended axially inwardly from the collet.

3. The tube fitting of claim 1 wherein said gripping portion comprises an annular boss.

4. The tube fitting of claim 1 wherein said gripping portion comprises an annular boss defining a sharp radially inner end adapted to bite into the tube end when said axially inner end of the collet is constricted thereabout.

5. The tube fitting of claim 1 wherein said inner end of the collet is provided with a plurality of said slots, said slots being equiangularly spaced about the axis of said collet.

6. The tube fitting of claim 1 wherein said body outer end is formed of a material having a rigidity greater than that of said collet inner end.

7. The tube fitting of claim 1 wherein said collet is formed of metal.

8. The tube fitting of claim 1 wherein said body outer end is defined by metal deformed beyond its elastic limit.

9. The tube fitting of claim 1 wherein said body outer end further defines an axially inner cylindrical portion of the through bore outer end having a diameter equal to the diameter of the frustoconical surface poriton at its axially inner end, and said fitting further includes an O-ring seal radially inwardly of said axially inner cylindrical surface portion.

10. The tube fitting of claim 1 wherein said body outer end further defines an axially inner cylindrical portion of the through bore outer end having a diameter equal to the diameter of the frustoconical surface portion at its axially inner end, and said fitting further includes an O-ring seal radially inwardly of said axially inner cylindrical surface portion, the axial length of said axially inner cylindrical surface portion being greater than the cross-sectional diameter of the O-ring seal.

* * * * *